United States Patent
Swanenberg et al.

(10) Patent No.: US 12,281,631 B2
(45) Date of Patent: Apr. 22, 2025

(54) WAVE ENERGY CONVERTER AND A METHOD OF GENERATING ELECTRICAL POWER FROM WAVE ENERGY

(71) Applicant: DUTCH WAVE POWER B.V., Vught (NL)

(72) Inventors: Sten Swanenberg, Vught (NL); Hans Lustig, Vught (NL)

(73) Assignee: DUTCH WAVE POWER B.V., Vught (NL)

( * ) Notice: Subject to any disclaimer, the term of this patent is extended or adjusted under 35 U.S.C. 154(b) by 47 days.

(21) Appl. No.: 18/031,982

(22) PCT Filed: Oct. 19, 2021

(86) PCT No.: PCT/NL2021/050632
§ 371 (c)(1),
(2) Date: Apr. 14, 2023

(87) PCT Pub. No.: WO2022/093013
PCT Pub. Date: May 5, 2022

(65) Prior Publication Data
US 2024/0018933 A1    Jan. 18, 2024

(30) Foreign Application Priority Data
Oct. 26, 2020   (NL) .................................. 2026767

(51) Int. Cl.
*F03B 13/18*    (2006.01)
(52) U.S. Cl.
CPC ...... *F03B 13/1815* (2013.01); *F03B 13/1885* (2013.01); *F05B 2240/93* (2013.01)

(58) Field of Classification Search
CPC .............. F03B 13/1815; F03B 13/1885; F05B 2240/93
(Continued)

(56) References Cited

U.S. PATENT DOCUMENTS 5,359,229 A * 10/1994 Youngblood ....... F03B 13/1855
60/507
2005/0160845 A1* 7/2005 Keefe ...................... F03G 7/10
74/84 S (Continued)

OTHER PUBLICATIONS

Patent Cooperation Treaty, International Search Report, Application No. PCT/NL2021/050632, dated Jan. 19, 2022, in 3 pages.

*Primary Examiner* — Charles Reid, Jr.
(74) *Attorney, Agent, or Firm* — Procopio, Cory, Hargreaves & Savitch LLP

(57) ABSTRACT

A wave energy converter includes a float that includes an air chamber that includes a generator that is arranged between the float and a shaft, and that is configured to generate electrical power when the float rotates relative to the shaft, and an elongate spacer configured to connect the float to an anchoring at, on or to a floor of a water body. The float is configured to rotate as the shaft moves along the elongate spacer due to waves and/or tidal movement of the water body. The air chamber includes the shaft that is rotatably suspended inside the float and having a holder configured to substantially arrest the shaft against rotation as the float rotates around the shaft. The shaft is completely arranged inside the float, and the air chamber shields the shaft and the generator off from the water body.

20 Claims, 8 Drawing Sheets

(58) Field of Classification Search
USPC .................................. 290/39, 42, 43, 53, 54
See application file for complete search history.

(56) References Cited

U.S. PATENT DOCUMENTS

| | | |
|---|---|---|
| 2007/0089409 A1 | 4/2007 | Molina |
| 2008/0272600 A1 | 11/2008 | Olson |
| 2011/0018275 A1 | 1/2011 | Sidenmark |
| 2013/0009401 A1* | 1/2013 | Biteryakov ............. F03B 13/10 29/596 |
| 2017/0047820 A1* | 2/2017 | Degriek .................. F03B 13/14 |
| 2020/0011289 A1 | 1/2020 | Steenstrup |

* cited by examiner

WAVE ENERGY CONVERTER AND A METHOD OF GENERATING ELECTRICAL POWER FROM WAVE ENERGY

CROSS-REFERENCE TO RELATED APPLICATIONS

This application is US National Stage of International Patent Application PCT/NL2021/050632, filed Oct. 19, 2021, which claims benefit of priority from Dutch Patent Application 2026767, filed Oct. 26, 2020, the contents of both of which are incorporated herein by reference.

The present invention relates to a wave energy converter, as well as to a method of generating electrical power from wave energy.

Wave energy converters (WECs) convert wave energy into electrical power. Wave power is a renewable energy source that has a high power density compared to other renewable energy sources.

Various concepts of wave-energy devices have been developed and tested in the past, such as point absorber buoys, surface attenuators, oscillating wave surge converters, oscillating water column converters, overtopping devices, submerged pressure differential converters and floating in-air converters.

The present invention is most closely related to a point absorber buoy, which is a device that floats on the surface of the water, normally connected to the seabed via cables to prevent drifting off. Although wave energy converters may in theory be applicable in big lakes, they are normally applied in the sea, and consequently in salt water. Wave energy converters belonging to the point absorber buoy category moreover operate at the surface of the sea, where salt water and ambient air together provide a harsh environment for any type of mechanical system. There is an ongoing need to further improve wave energy converters, in particular aspects such as the reliability and efficiency thereof.

United States patent application US 2020/011289 A1 discloses a wave energy converter having a float that comprises a drum housing. An anchoring cable extends from the drum housing to the sea bottom. The drum housing rotates relative to the float when the float is lifted and/or moved horizontally by waves, causing an electrical generator that is arranged inside the drum housing, to produce electrical power. When the cable unwinds, a torsion spring is tensioned. When a wave reaches the fall of the wave, the float is moved downwards with the wave, and the torsion spring will act to release the tension obtained during the rise of the wave, whereby the drum housing is rotated by the torsion spring in the opposite direction for winding up the cable on the cable reel. This rotation of the drum housing activates the electrical generator. The drum housing is rotatable arranged relative to the float via a shaft that extends through side walls of the drum housing. A watertight connection, such as a watertight rotating seal, is provided to provide a dry atmosphere within the drum housing for protecting mechanical and electrical components, which are arranged within the drum housing. A disadvantage of such an arrangement is that such seals may start to leak, especially as they wear out over time. If leakage occurs, the electrical components will fail and a short circuit may occur. The mechanical parts inside the drum housing may also suffer from such a leakage, especially considering the aggressive nature of salt water. For this reason, a design relying on vulnerable seals will have to be checked and maintained on a regular basis, which is especially cumbersome for offshore systems.

United States patent application US 2007/089409 A1, which is considered the closest prior art, has a similar configuration as US 2020/011289 A1 discussed above. A structure comprises a shaft that is static relative to this structure. A drum housing, that defines a floating body, is rotatable relative to this static shaft. When the water level rises under the effect of arrival of a wave the floating body receives the thrust of the wave and starts its ascending travel. A cable unwinds from the drum housing, causing the moving drum housing of the floating body to rotate in relation to the static shaft integral to the structure. The rotary movement of the drum housing is transmitted to an electrical generator housed inside the floating body, through a crown gear, from a pinion which meshes with said crown gear and from a multiplier attached to said pinion. In order to protect the electrical generator and the mechanical components inside the drum housing from the salt sea water, it is assumed that a (not mentioned) seal will be present between the drum housing and static shaft.

United States patent application US 2011/018275 A1 discloses a wave energy converter, wherein a drum rotates relative to a float. The drum is arranged in a power train room that may be partially submerged, exposing the mechanics to the salt sea water and causing the drums to experience resistance when they rotate relative to the water body. The generator will have to be sealed off from the salt water.

An objective of the present invention is to provide a wave energy converter that is improved relative to the prior art and wherein at least one of the above stated problems is obviated or alleviated.

Said objective is achieved with the wave energy converter according to the present invention.

The generator is arranged between the float and the shaft in a functional meaning, i.e. the generator is connected with one part thereof to the shaft, and with another part thereof to the float, to allow said generator to be driven via a relative rotation between the shaft and the float. The skilled person will understand that said shaft may be completely arranged inside the float in a physical meaning, i.e. the shaft is physically present inside the float, and more particularly in the air chamber of the float.

By arranging the shaft and generator inside an air chamber of the float, these moving and relatively vulnerable parts are shielded off from the harsh conditions of the surrounding environment. After all, salt sea water in combination with ambient air results in a rather aggressive environment. Moreover, arranging these moving parts inside the air chamber also prevents these parts from experiencing any resistance from the water, thereby further improving the efficiency of the generator. The shaft and generator may be arranged inside a closed air chamber by virtue of, on the one hand, the float itself rotating when it moves along the elongate spacer due to waves and/or tidal movement of the water body, and on the other hand, by virtue of the shaft having a holder configured to substantially arrest the shaft against rotation as the float rotates around the shaft.

The function of the holder is to cause a relative rotation between the shaft and the float, to allow the generator to generate electrical power. The skilled person will understand that it is not required to fully arrest the shaft against rotation. Some movement of the shaft may be acceptable as long as a relative rotation between the shaft and the float for driving the generator is maintained, which is reflected by the wording "substantially" arrest. Preferably "substantially" is interpreted as allowing the shaft to rotate a maximum of 120° during normal use, as will be discussed in more detail below.

Contrary to the wave energy converter disclosed in US 2020/011289 A1 and the closest prior art US 2007/089409 A1, the present invention completely seals the shaft and the generator off from the water body by fully enclosing said shaft and generator inside the float. In this way, a reliable and low maintenance wave energy converter is provided that is not dependent on any type of vulnerable sealing. The float itself is configured to rotate as it moves along the elongate spacer due to waves and/or tidal movement of the water body. Moreover, the float comprises an air chamber configured to accommodate the shaft that is rotatably suspended inside the float. The shaft has a holder configured to substantially arrest the shaft against rotation as the float rotates around the shaft. The holder substantially arresting the shaft against rotation as the float rotates around the shaft results in a relative rotation between the rotating float and the shaft that allows the generator to be driven for producing electrical power. All moving parts for generating electrical power, such as an optional gear box and the generator, are fully enclosed by the rotatable float. There is no need for sealing members that are rotating relative to each other. A power cable may extend out of the float. This may be a non-rotatable connection, since the float will normally rotate a limited number of revolutions back and forth, and rotation of the power cable may therefore be easily absorbed by the length of the power cable. Such a non-rotable connection of the power cable may be sealed reliably, and is far less critical than sealing rotatable connections.

As mentioned above, the wave energy converter according to the invention is most closely related to a "point absorber buoy" wave energy converter type, which is a device that floats on the surface of the water, normally connected to the seabed via cables to prevent drifting off. It however also has aspects of a surge converter, wherein the 'point' of the point absorber buoy is extended along to the wave front, providing the additional ability to align to the wave front direction, as will be explained below in more detail.

According to a preferred embodiment, the holder of the shaft that is rotatably suspended inside the float is defined by a weight arranged on one side of the shaft to thereby cause said side to be substantially oriented downwards due to gravity. Such a holder allows an infinite number of revolutions of the float relative to the shaft. To the contrary, a torsion spring, as applied in US 2020/011289 A1 and US 2007/089409 A1, is limited to a restricted relative rotation between the float and the shaft. Moreover, such a holder is of a simple design and therefore requires very limited maintenance and provides a very reliable construction.

The above mentioned maximum of 120° of rotation of the shaft during normal use may be interpreted as the weight that is arranged on one side of the shaft, and that will in a resting state be oriented downwards due to gravity, swiveling about 60° back and forth relative to the vertical resting state. As the holder only rotates about 60° back and forth, the generator that is arranged between the float and the shaft will be able to generate electrical power.

However, due to the holder of the shaft that is rotatably suspended inside the float being defined by a weight arranged on one side of the shaft in combination with the free rotating nature of the float relative to the shaft, a constructive simple, reliable and effective safety measure is obtained. After all, in extreme wave conditions the holder may rotate more than the above mentioned 60° back and forth, and possibly even make more than a full rotation, i.e. the weight rotating over the upper side of the shaft.

Said objective is furthermore obtained with a method of generating electrical power from wave energy, comprising the steps of:

arranging a float in a water body;
arranging a shaft completely inside the float and rotatably suspending the shaft inside an air chamber of the float to thereby shield the shaft off from the water body;
arranging a generator that is configured to generate electrical power when the float rotates relative to the shaft between the float and the shaft and inside the air chamber of the float to thereby shield the generator off from the water body;
connecting the float with an elongate spacer to an anchoring at, on or to a floor of the water body;
rotating the float as it moves along the elongate spacer due to waves and/or tidal movement of the water body;
arresting the shaft that is arranged in the air chamber of said float against rotation as the float rotates around the shaft; and
generating electrical power from the relative rotation between the rotating float and the shaft.

Preferred embodiments are the subject of the dependent claims.

In the following description preferred embodiments of the present invention are further elucidated with reference to the drawing, in which.

Figure 1:
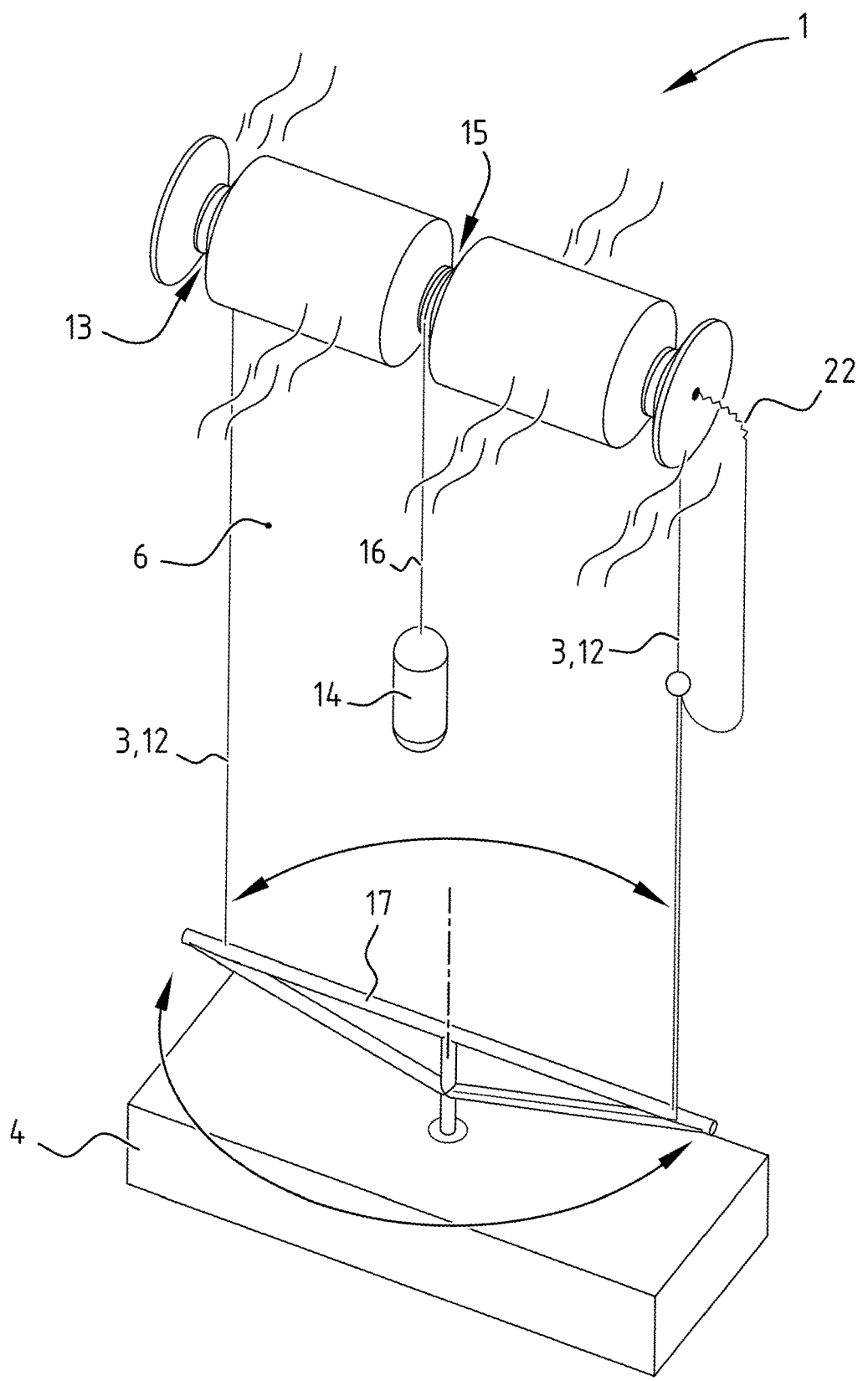
FIG. 1 is a perspective view of a wave energy converter according to a first preferred embodiment of the invention.
Figure 2:
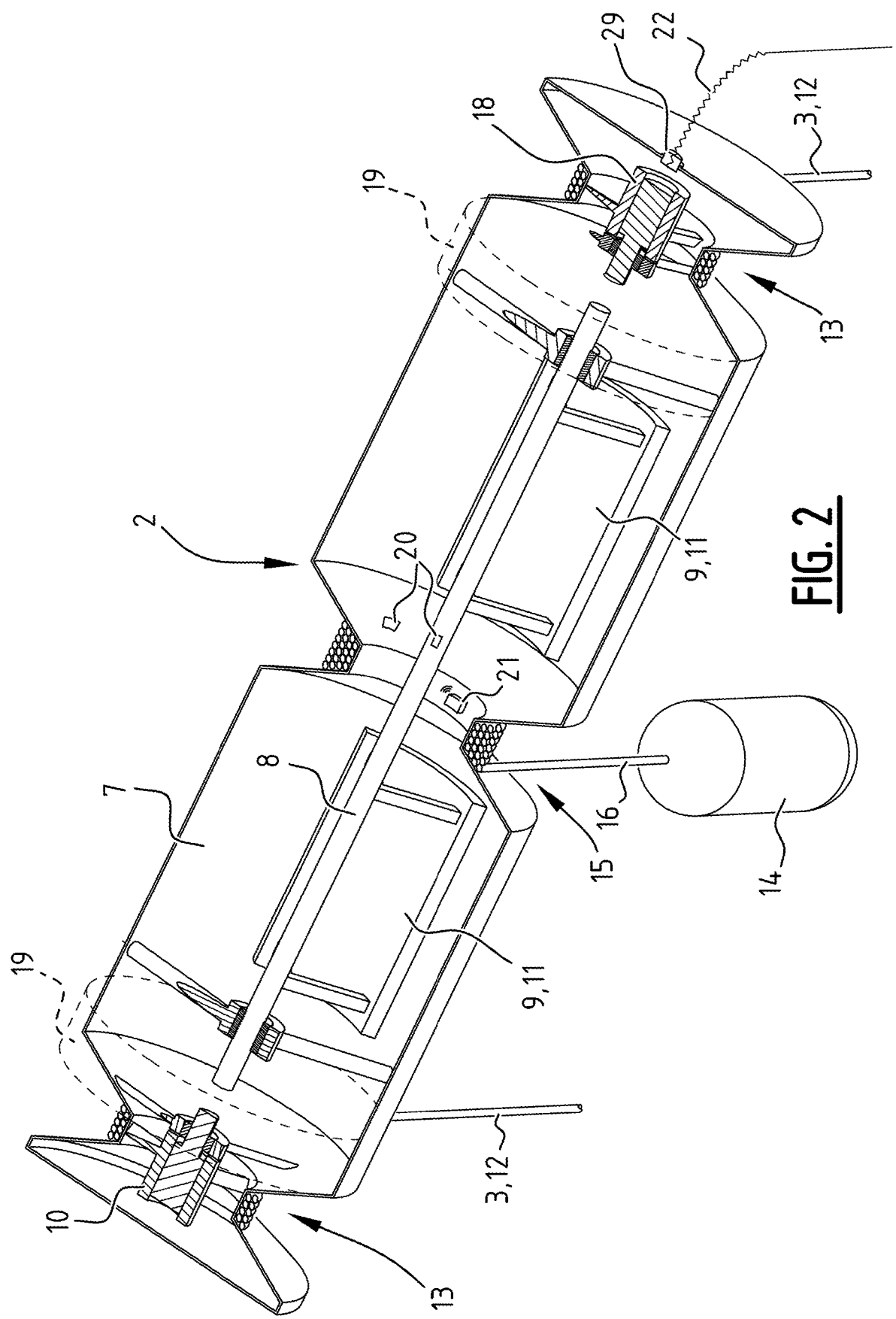
FIG. 2 is a cross-sectional perspective detail view of the wave energy converter of FIG. 1.
Figure 3:
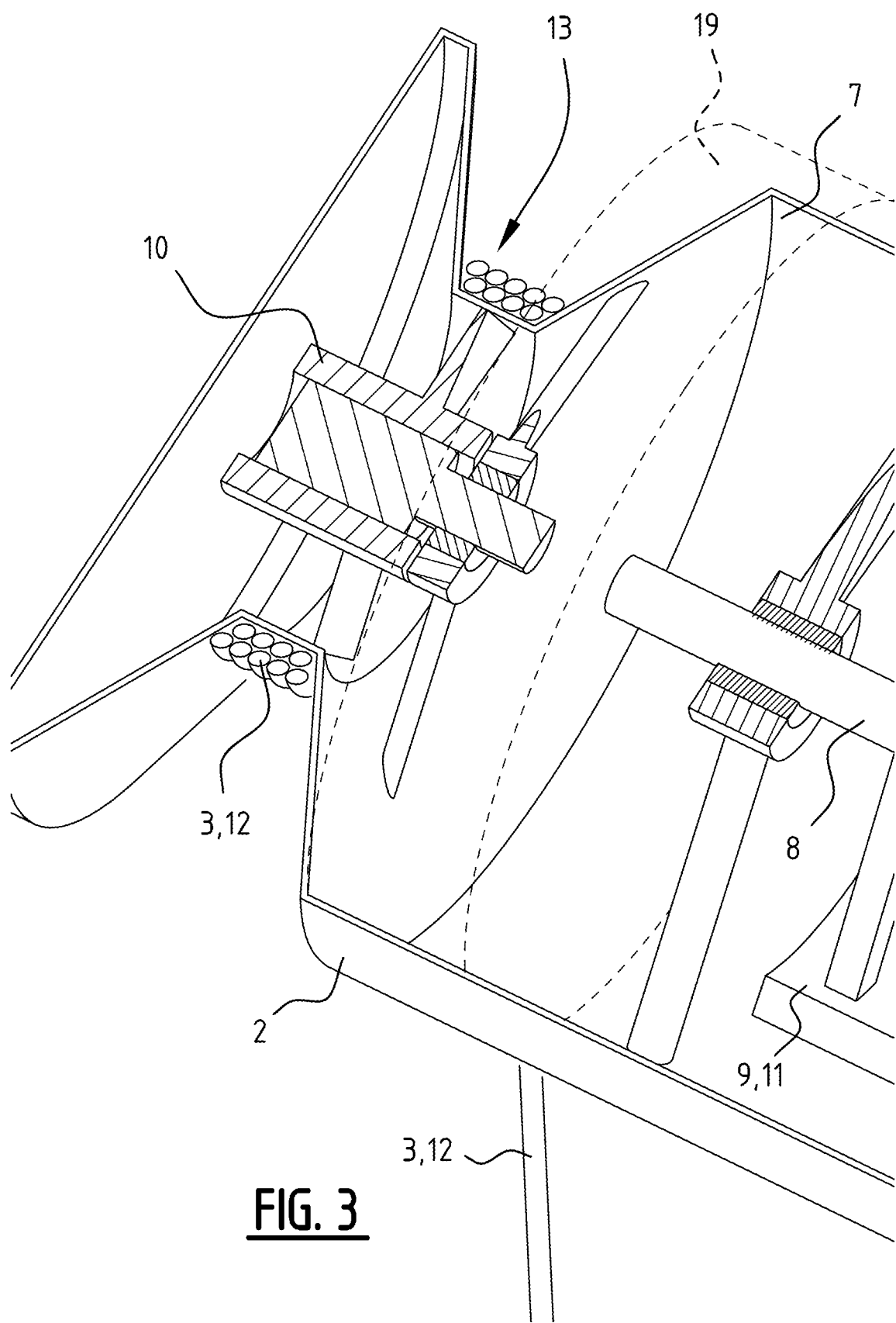
FIG. 3 is a further cross-sectional perspective detail view of the wave energy converter of FIG. 1.
Figure 4:
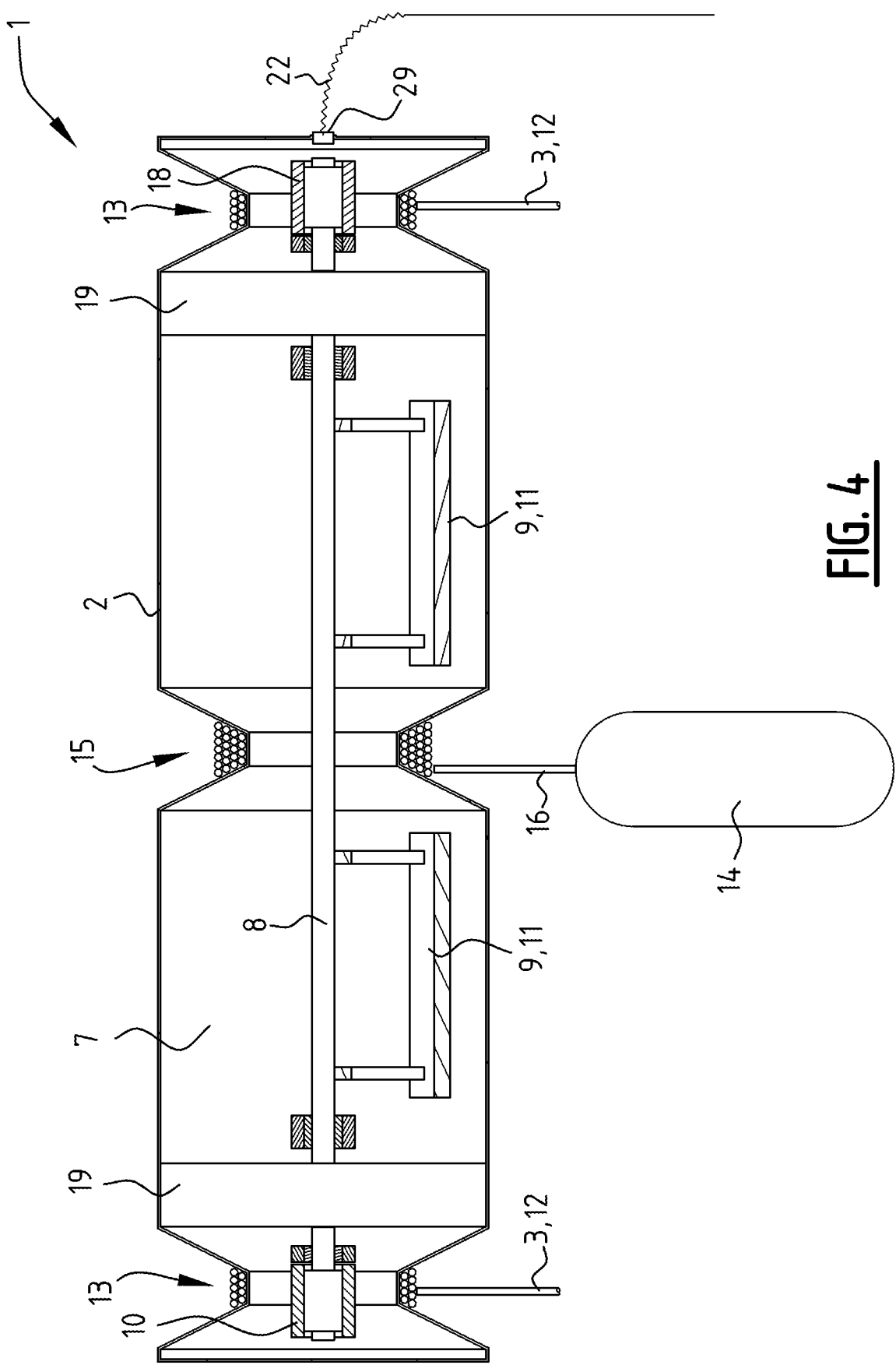
FIG. 4 is a cross-sectional side view of the wave energy converter of FIG. 1.
Figure 5:
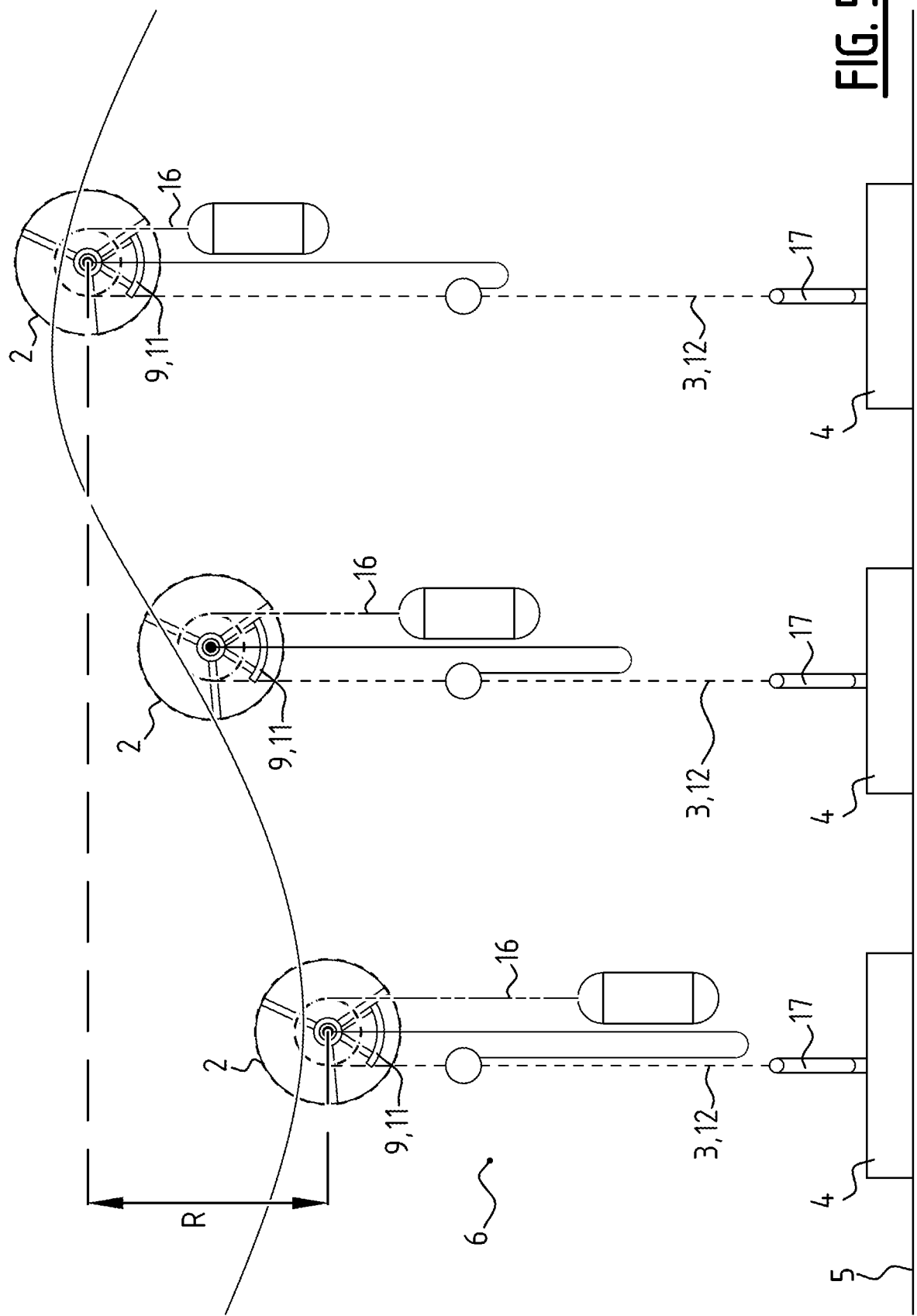
FIG. 5 is a schematic view showing successive steps of the wave energy converter in operation.
Figure 6:
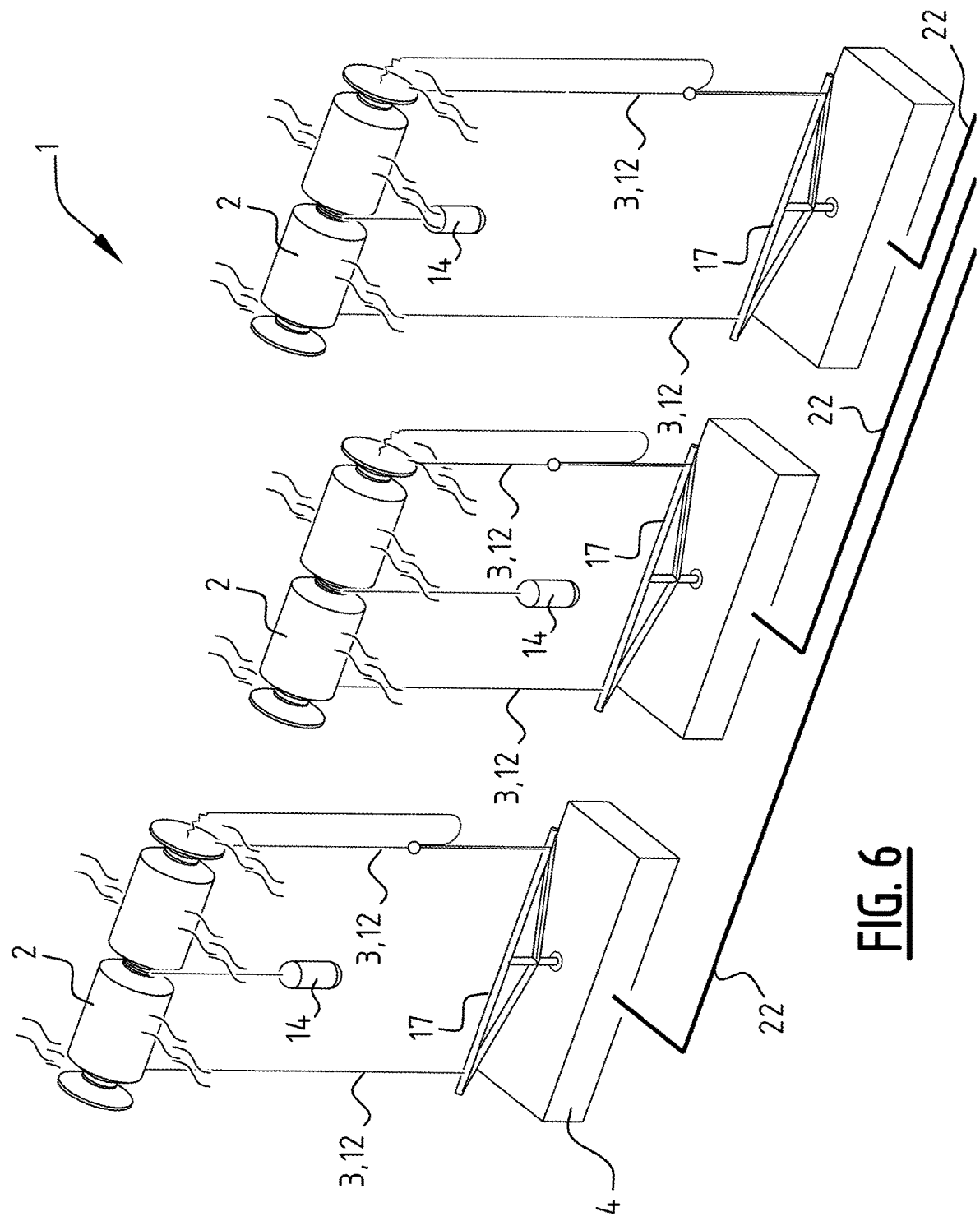
FIG. 6 is a perspective view of a further operating state of wave energy converters during operation.

The wave energy converter 1 comprises a float 2 and an elongate spacer 3 configured to connect the float 2 to an anchoring 4 at, on or to a floor 5 of a water body 6 (FIG. 1). Although the anchoring 4 is shown as a body on the floor 5 of the water body 6, it is explicitly mentioned that the anchoring 4 may be defined by an offshore foundation, such as a monopile or a jacket, or an oilrig. The float 2 is configured to rotate as it moves along the elongate spacer 3 due to waves and/or tidal movement of the water body 6. Said float 2 comprises an air chamber 7 for housing a shaft 8 having a holder 9 configured to substantially arrest the shaft 8 against rotation as the float 2 rotates around the shaft 8, and a generator 10 that is arranged between the float 2 and the shaft 8 and that is configured to generate electrical power when the float 2 rotates relative to the shaft 8 (FIGS. 2-4). The air chamber 7 shields the shaft 8 and the generator 10 off from the water body 6 in which the float 2 floats. The air chamber 7 may simultaneously also shield other components, such as bearings, off from the water body 6, thereby allowing high quality bearings to be used that further reduce rotational resistance and thus increase efficiency of the wave energy converter 1. By shielding moving components off from the environment, the reliability, durability and efficiency increases. A reduction in rotational resistance is obtained by the moving parts moving in air, rather than in water, which is the case in many conventional prior art designs.

In the shown embodiment, the holder 9 of the shaft 8 is defined by a weight 11 arranged on one side of the shaft 8 to thereby cause said side to be substantially oriented downwards due to gravity, as shown in FIGS. 2-4. The skilled person will understand that the shaft 8 may rotate back and forth over a limited angular range when the weight 11 slightly swings during normal operation. However, the weight 11 is preferably large enough to substantially arrest the shaft 8. In very harsh conditions with big waves, additional measures, that will be discussed below in more detail, may be taken to prevent the weight to swing too much, for example more than 90° clockwise and counterclockwise relative to its equilibrium state during rest.

In the embodiment shown in FIGS. 1-6, the elongate spacer 3 comprises at least one anchoring cable 12 that is arranged between the float 2 and the anchoring 4. The skilled person will understand that a rigid spacer 23, such as a post, may provide an alternative to the elongate spacer 3 being embodied by the anchoring cable 12. Such as rigid spacer 23 may support a rack-and-pinion construction, wherein the float 2 may comprise an external toothing 25 defining the pinion that engages with an external rack 24 arranged on the rigid spacer 23, as shown in the further embodiments of FIGS. 7-9.

The float 2 defines or comprises at least one anchoring reel 13 that is configured to receive the at least one anchoring cable 12. As can be best seen in FIGS. 5 and 6, the wave energy converter 1 is configured to unwind the anchoring cable 12 from the anchoring reel 13 when the float 2 moves upwards in the water body 6, and to wind the anchoring cable 12 onto the anchoring reel 13 when the float 2 moves downwards in the water body 6. Consequently, the float 2 will rotate as it moves along the elongate spacer 3, 12 due to waves and/or tidal movement of the water body 6.

In order to stimulate the float 2 to rotate again when the wave or water level drops, the wave energy converter 1 preferably further comprises a counterweight 14 that is suspended from the float 2. This counterweight 14 is configured to move towards the float 2 when the float 2 moves upwards in the water body 6, and to move away from the float 2 when the float 2 moves downwards in the water body 6, to thereby cause the float 6 to rotate relative to the shaft 8. After all, the shaft 8 will still be arrested against rotation by its holder 9, i.e. by weight 11 moving towards its equilibrium state under the influence of gravity.

The float 2 may define or comprise a spool 15 that is configured to receive a flexible suspension 16, such as a cable or chain, that is connected to the counterweight 14, which is best seen in FIGS. 1, 2, 4 and 6.

The anchoring cable 12 and the flexible suspension 16 that is connected to the counterweight 14 have opposite winding directions relative to the float 2, i.e. relative to the anchoring reel 13 and the spool 15, respectively. The flexible suspension 16 winds around the spool 15 when the float 2 moves upwards in the water body 6 as a result of the float 2 rotating in a first direction, and unwinds from the spool 15 when the float 2 moves downwards in the water body 6 and rotates in a second direction, that is opposite the first direction.

A diameter of the spool 15 that is configured to receive the flexible suspension 16 that is connected to the counterweight 14 and a diameter of the anchoring reel 13 that is configured to receive the at least one anchoring cable 12 comprise substantially the same dimension. In this way, an optimum balance between the mass of the counterweight 14 and its range of motion is obtained, keeping in mind that the range of motion of the counterweight 14 is two times the range of motion of the float 2. A smaller diameter of the spool 15 would require a heavier weight which would require more material, whereas a larger diameter of the spool would result in a larger range of motion of the counterweight 14. Moreover, although the counterweight 14 may be lighter when the diameter of the spool 15 is larger, a too light counterweight may have the risk to drift in strong currents, possibly causing the flexible suspension 16, that may be a cable, to become entangled with the anchoring cable 12.

In a preferred embodiment, the float 2 and the shaft 8 are elongate members, wherein the dimension of the float 2 may be chosen in relation to the length of the waves at the location where the wave energy converter 1 is going to be installed.

In the shown embodiment, the float 2 defines or comprises at least two anchoring reels 13 at a longitudinal offset relative to each other, and the spool 15 that is configured to receive the flexible suspension 16 that is connected to the counterweight 14 is arranged between the at least two anchoring reels 13. This arrangement provides the advantage that the float 2 may be connected in a reliable and stable manner to the anchoring 4. As indicated in FIG. 1, the anchoring may comprise a rotating attachment 17 to allow the float 2 to adjust its position in dependence of the actual wave direction at a specific time.

A rotation axis of the shaft 8 is preferably co-axially aligned with a rotation axis of the float 2.

The wave energy converter 1 may comprise one or more than one further generator 18 that is configured to generate electrical power when the float 2 rotates relative to the shaft 8. If the generator 10 and the one or more than one further generator 18 are independently and selectively operable, the wave energy converter 1 may be easily optimized when conditions vary. For example, only one of the generator 10 and the one or more than one further generator 18 may be active when the waves are small and have a limited power density, whereas multiple generators 10, 18 of the generator 10 and the one or more than one further generator 18 may be set in an active state when the waves have a higher power density. It is mentioned that, also if the wave energy converter 1 comprises only one generator 10, this single generator 10 may also be selectively operable, for example in order to temporarily switch off said generator 10.

The wave energy converter 1 may further comprise a gear box 19 that is configured to increase a rotational speed of the generator 10, or possibly of the one or more than one further generator 18, relative to a rotational speed of the float 2.

Also, the wave energy converter 1 may comprise:
one or more than one sensor 20 for monitoring at least one of a rotational speed of the float 2, a rotational movement of the shaft 8 inside the float 2 and a relative rotational speed of the float 2 relative to the shaft 8 inside the float 2; and
a controller 21, configured to control the generator 10 in dependency of the data obtained by the one or more than one sensor 20 to thereby adjust a load that the generator 10 causes to the shaft 8. For example, when the controller 21 receives information from the one or more than one sensor 20 that the rotational movement of the shaft 8 inside the float is too much, for example said shaft swinging more than 90° clockwise or counterclockwise to its equilibrium state due to extremely strong waves, the controller 21 may decrease the load caused by the generator 10 to the shaft to thereby prevent the shaft 8 from making a full rotation, i.e. the weight 11 moving over the top in the air chamber 7. On the other hand, if the waves have a too low power density for the generator 10 to work efficiently, the controller 21 may switch the generator 10 off in anticipation of stronger waves.

It is mentioned that, although the float 2 rotates, energy output may be done with a normal power cable 22 without the need for special swiveling connectors. After all, the float 2 will rotate only a few revolutions during its vertical range of motion R (FIG. 5), and at most about ten revolutions for small designs. Considering an operating depth of several tens of meters, a power cable will have sufficient flexibility to absorb the windings over its length. The power cable 22 may extend out of the float 2 and may be sealed off with a seal 29 that is configured to seal the air chamber 7 off from the water body 6. Alternatively, the power cable 22 may be connected in another watertight manner.

Figure 7A:
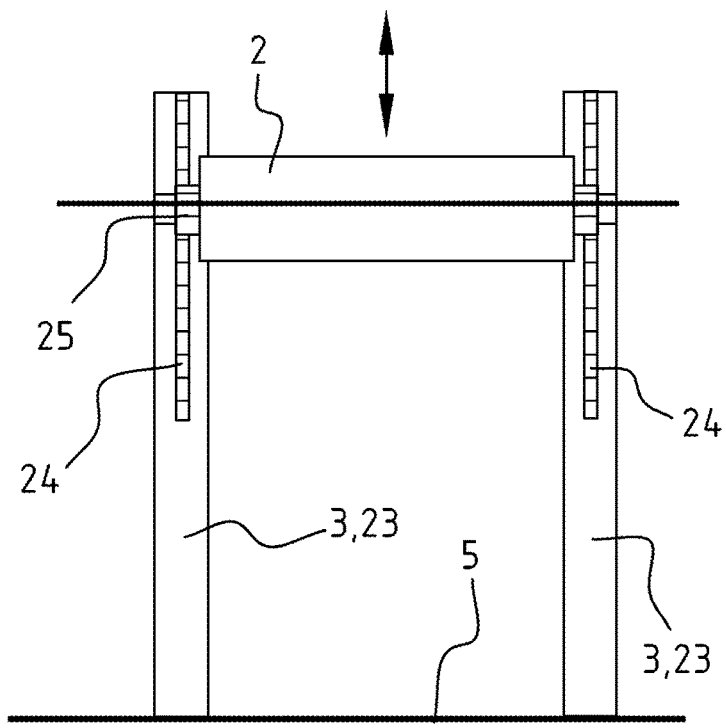
FIGS. 7A and 7B show front and side views of a wave energy converter according to a second preferred embodiment of the invention.
Figure 7B:
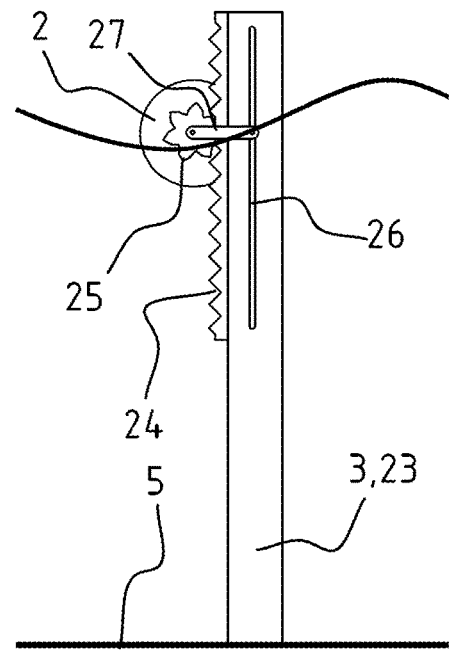

According to a second preferred embodiment of the invention that is shown in front and side views in FIGS. 7A and 7B, the elongate spacer 3 is embodied as a rigid spacer 23 supporting a rack-and-pinion construction. The rigid spacer 23 supports a rack 24 that is engageable by an external toothing 25 of the float 2 that defines the pinion of the rack-and-pinion construction. In order to prevent the float 2 to drift away from the rigid spacer 3, 23, and to thereby guarantee a secure engagement between the external toothing 25, defining the pinion, and the rack 24, a securing link 27 is guidable in a guide 26.

Figure 8A:
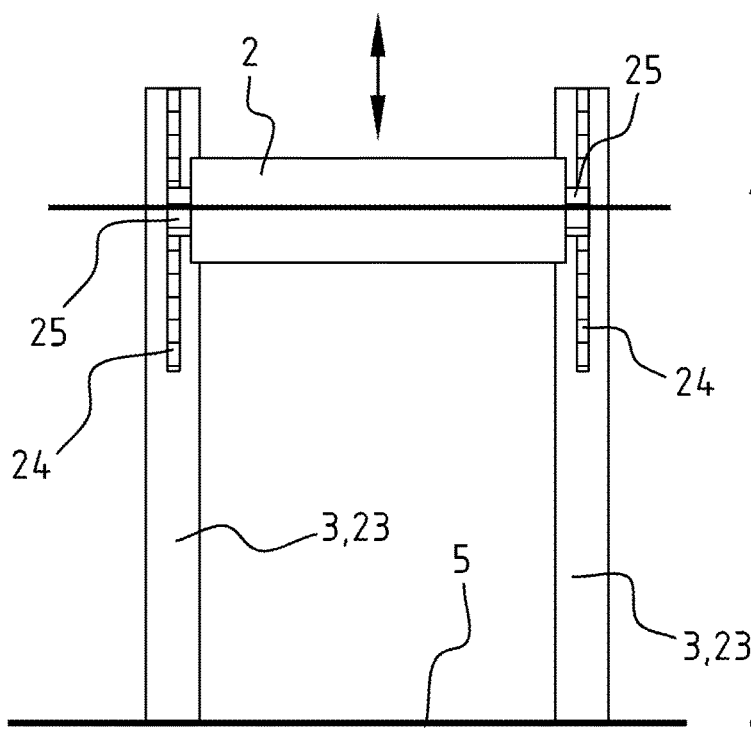
FIGS. 8A and 8B show front and side views of a wave energy converter according to a third preferred embodiment of the invention.
Figure 8B:
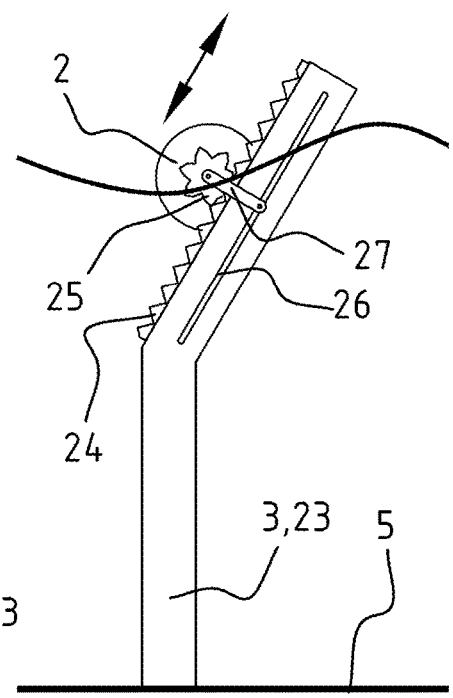

The third preferred embodiment shown in FIGS. 8A and 8B is very closely related to the second preferred embodiment shown in FIG. 7, and only differs in that the rack-and-pinion construction is arranged at an angle. In this way, the float 2 will also benefit from a horizontal component of waves, while also travelling a longer distance along the rack for a given vertical wave displacement.

Figure 9:
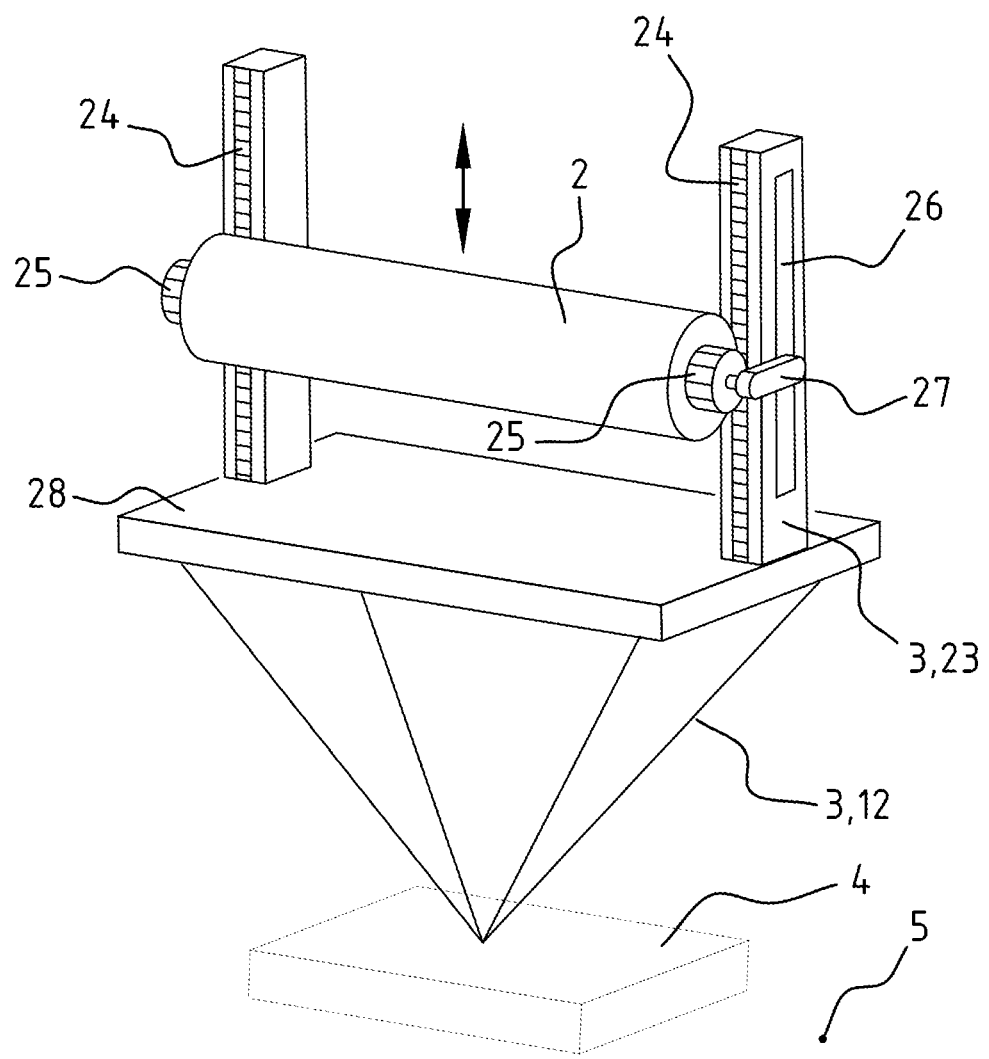
FIG. 9 is a perspective view of a wave energy converter according to a fourth preferred embodiment of the invention.

The fourth preferred embodiment shown in FIG. 9 shows that the elongate spacer 3 may be an assembly of a flexible elongate spacer in the form of anchoring cables 12, and a rigid spacer 23 in the form of upright posts, extending from a floating platform 28.

It is remarked that the weight of the float 2 itself is sufficient to support a downward movement of the float 2 along the elongate spacer 3 in the second, third and fourth embodiment. A counterweight 14 as applied for the first embodiment is redundant for the second, third and fourth embodiment.

The wave energy converter 1 may be used in a method of generating electrical power from wave energy, comprising the steps of:
arranging the float 2 in the water body 6;
arranging the shaft 8 completely inside the float 2 and rotatably suspending the shaft 8 inside an air chamber 7 of the float 2 to thereby shield the shaft 8 off from the water body 6;
arranging a generator 10 that is configured to generate electrical power when the float 2 rotates relative to the shaft 8 inside the air chamber 7 of the float 2 to thereby shield the generator 10 off from the water body 6;
connecting the float 2 with the elongate spacer 3 to the anchoring 4 at, on or to a floor 5 of the water body 6;
rotating the float 2 as it moves along the elongate spacer 3 due to waves and/or tidal movement of the water body 6;
arresting the shaft 8 that is arranged in the air chamber 7 of said float 2 against rotation as the float 2 rotates around the shaft 8; and
generating electrical power from the relative rotation between the rotating float 2 and the shaft 8.

Although they show preferred embodiments of the invention, the above described embodiments are intended only to illustrate the invention and not to limit in any way the scope of the invention. Accordingly, it should be understood that where features mentioned in the appended claims are followed by reference signs, such signs are included solely for the purpose of enhancing the intelligibility of the claims and are in no way limiting on the scope of the claims. Furthermore, it is particularly noted that the skilled person can combine technical measures of the different embodiments. The scope of protection is defined solely by the following claims.

The invention claimed is:

1. A wave energy converter, comprising:
a float that comprises an air chamber that comprises a generator that is arranged between a surface of the float and a shaft, and that is configured to generate electrical power when the float rotates relative to the shaft; and
an elongate spacer configured to connect the float to an anchoring at, on or to a floor of a water body;
wherein the float is configured to rotate as the float moves along the elongate spacer due to waves and/or tidal movement of the water body,
wherein the air chamber comprises the shaft that is rotatably suspended inside the float and having a holder configured to substantially arrest the shaft against rotation as the float rotates around the shaft, and
wherein the shaft is completely arranged inside the float, and the air chamber shields the shaft and the generator off from the water body.

2. The wave energy converter according to claim 1, wherein the holder of the shaft that is rotatably suspended inside the float is defined by a weight arranged on one side of the shaft to thereby cause said side to be substantially oriented downwards due to gravity.

3. The wave energy converter according to claim 1, wherein the elongate spacer comprises at least one anchoring cable that is arranged between the float and the anchoring.

4. The wave energy converter according to claim 3, wherein the float defines or comprises at least one anchoring reel that is configured to receive the at least one anchoring cable.

5. The wave energy converter according to claim 4, configured to:
unwind the anchoring cable from the anchoring reel when the float moves upwards in the water body; and
wind the anchoring cable onto the anchoring reel when the float moves downwards in the water body.

6. The wave energy converter according to claim 4, wherein a diameter of a spool that is configured to receive a flexible suspension that is connected to a counterweight and a diameter of the anchoring reel that is configured to receive the at least one anchoring cable comprise substantially a same dimension.

7. The wave energy converter according to claim 1, further comprising a counterweight that is suspended from the float and configured to move:

towards the float when the float moves upwards in the water body; and away from the float when the float moves downwards in the water body, to thereby cause the float to rotate relative to the shaft.

8. The wave energy converter according to claim 7, wherein the float defines or comprises a spool that is configured to receive a flexible suspension that is connected to the counterweight.

9. The wave energy converter according to claim 8, wherein the flexible suspension:

winds around the spool when the float moves upwards in the water body; and unwinds from the spool when the float moves downwards in the water body.

10. The wave energy converter in dependency of at least claim 3 in dependency of at least claim 3, wherein an anchoring cable and the flexible suspension that is connected to the counterweight have opposite winding directions relative to the float.

11. The wave energy converter according to claim 8, wherein:

the float defines or comprises at least two anchoring reels at a longitudinal offset relative to each other; and the spool that is configured to receive the flexible suspension that is connected to the counterweight is arranged between the at least two anchoring reels.

12. The wave energy converter according to claim 1, wherein the float and the shaft are elongate members.

13. The wave energy converter according to claim 1, wherein a rotation axis of the shaft is co-axially aligned with a rotation axis of the float.

14. The wave energy converter according to claim 1, comprising one or more than one further generator, including another shaft, that is configured to generate electrical power when the float rotates relative to the shaft.

15. The wave energy converter according to claim 14, wherein the generator and the one or more than one further generator are independently and selectively operable.

16. The wave energy converter according to claim 1, comprising a gear box that is configured to increase a rotational speed of the generator relative to a rotational speed of the float.

17. The wave energy converter according to claim 1, further comprising:

one or more than one sensor for monitoring at least one of a rotational speed of the float, a rotational movement of the shaft inside the float and a relative rotational speed of the float relative to the shaft inside the float; and a controller, configured to control the generator in dependency of data obtained by the one or more than one sensor to thereby adjust a load that the generator causes to the shaft.

18. The wave energy converter according to claim 1, further comprising an energy output comprising a power cable.

19. A method of generating electrical power from wave energy, comprising:

arranging a float in a water body;

arranging a shaft completely inside the float and rotatably suspending the shaft inside an air chamber of the float to thereby shield the shaft off from the water body;

arranging a generator that is configured to generate electrical power when the float rotates relative to the shaft inside the air chamber of the float to thereby shield the generator off from the water body;

connecting the float with an elongate spacer to an anchoring at, on or to a floor of the water body;

rotating the float as the float moves along the elongate spacer due to waves and/or tidal movement of the water body;

arresting the shaft that is arranged in the air chamber of said float against rotation as the float rotates around the shaft; and generating electrical power from the relative rotation between the rotating float and the shaft.

20. The method of generating electrical power from wave energy according to claim 19, further comprising applying a wave energy converter, the wave energy converter comprising:

the float that comprises the air chamber that comprises the generator that is arranged between the float and the shaft and that is configured to generate electrical power when the float rotates relative to the shaft;

the elongate spacer configured to connect the float to the anchoring at, on or to the floor of the water body; and wherein the float is configured to rotate as the float moves along the elongate spacer due to waves and/or tidal movement of the water body, characterized in that the air chamber comprises the shaft that is rotatably suspended inside the float and having a holder configured to substantially arrest the shaft against rotation as the float rotates around the shaft; and wherein the shaft is completely arranged inside the float and the air chamber shields the shaft and the generator off from the water body.

* * * * *